United States Patent Office 3,281,210
Patented Oct. 25, 1966

3,281,210
SILICA PIGMENTS AND PREPARATION THEREOF
Oliver W. Burke, Jr., 506 Intracoastal Drive, Fort Lauderdale, Fla., and Carey B. Jackson, Pompano Beach, Fla.;
said Jackson assignor to said Burke, Jr.
No Drawing. Filed Dec. 30, 1964, Ser. No. 422,456
1 Claim. (Cl. 23—182)

This application is a continuation-in-part of our copending applications S.N. 142, 661, now abandoned, S.N. 142,662, now Patent No. 3,172,726, S.N. 142,494, now Patent No. 3,202,525, S.N. 142,495, now Patent No. 3,178,388, S.N. 142,496, now abandoned, all filed October 3, 1961.

This invention relates to the preparation of silica pigment materials for the reinforcement of elastomers and the like, and aims generally to improve the same.

OBJECTS

Particular objects of the present invention, severally and interdependently, are to provide an improved process for the preparation of silica pigments for the reinforcement of elastomers and the like; to provide an improved silica pigment having useful characteristics and at an economical cost; and to provide, inter alia, an alkaline silica pigment having improved reinforcing properties.

Other objects and advantages of the invention will be apparent from a consideration of the herein set forth general and specific descriptions of illustrative embodiments thereof.

PRESENT INVENTION—IN GENERAL

In the preparation of silica pigment for the reinforcing of elastomers and the like it is desirable to obtain a pigment which not only imparts high tensile strength to the vulcanizates, but one which also imparts improved moduli thereto. In preparing such pigments by known processes these desiderata have not been attained, and it has been considered necessary to impart to the pigment a pH of between 5.0 and 7.2 to obtain the best approach thereto. This approach has heretofore been obtained by treating the pigment with mineral acid to a pH of about 5 and then raising the pH to the said range by the addition of alkali.

The present invention has disclosed that a superior reinforcing pigment can be prepared which is itself alkaline, e.g. has a pH in aqueous slurry of about 8.0 to 8.5, and which is nevertheless readily dispersible in elastomers, and which imparts improved tensile strength and/or moduli to elastomers as compared to the same precipitated silica after-treated with mineral acid and adjusted in pH as aforesaid.

The new pigment of the present invention is produced by the extensive treatment of precipitated silica pigment with carbon dioxide in a manner to produce an alkaline reinforcing pigment, and the following examples will make apparent details of the procedures employed and characteristics of the pigment obtained.

The silica product as wet filter or centrifuge cake may be master-batched with latices of natural or synthetic elastomers and/or plastomers.

The process may be conducted in a batchwise or stepwise manner, or continuously, depending on selected equipment.

The novel features of the invention are set forth in the claim appended hereto, but the practice of the invention itself will be more precisely understood by reference to the following specific examples embodying the same, which are to be considered as illustrative and not restrictive of the invention.

Example 1

In this example 3000 ml. of type "N" sodium silicate ($Na_2O(SiO_2)_{3.22}$) containing 6 moles of $Na_3O$ was diluted with 6 liters of water to which was added 348 g. (6 moles) of sodium chloride dissolved in 8 liters of water and the combination was placed in a ceramic vessel and was agitated by a 3 bladed 3" propeller driven 600 r.p.m. The acidulating agent consisted of 1260 g. (15 moles) of sodium bicarbonate dissolved in 15 liters of water. The acidulating agent was added to the dilute sodium silicate in a controlled manner according to Table I herein.

TABLE 1

| Time (minutes cumulative): | Acidulation (moles $NaHCO_3$ cumulative) |
|---|---|
| 0 | |
| 62 | 1.1 |
| 119 [1] | 3.0 |
| 129 | 3.9 |
| 165 | 6.0 |
| 180 | 7.1 |
| 199 | 9.0 |
| 219 | 12.0 |
| 237 | 15.0 |

[1] Initial precipitation of silica.

The precipitated silica pigment was allowed to stand overnight then filtered and slurried with 1 mole of sodium bicarbonate dissolved in 4 liters of water and let stand 1 hour, then filtered and reslurried with 4 liters of water, again filtered and then divided into 8 equal portions some of which were treated as follows:

A portion of said filter cake was dried overnight at 80° C., ground, screened and designated as silica I(a).

A portion of said filter cake was made just acid to phenolphthalein (pH range 8.0–9.8) by addition of 150 cc. of 2 N hydrochloric acid, after which it was filtered and twice reslurried in 4 liters of water and filtered. The filter cake was dried, ground and designated as silica I(b).

Another portion of said filter cake was slurried in 4 liters of water and made acid to methyl orange (pH range 3.1–4.4) with 2 N hydrochloric acid and brought back to an alkaline pH of 7.2 with sodium carbonate solution, then filtered, water washed, dried, ground and designated as silica I(c).

A portion of said filter cake of water washed precipitated silica pigment was slurried with 4 liters of water and placed in an agitated pressure vessel and while stirring left overnight with 15 p.s.i. carbon dioxide pressure maintained on the vessel. The so treated product was filtered, water washed, dried, ground, screened and designated as silica I(d).

A portion of said filter cake was boiled 1¾ hours with live steam, before treating with carbon dioxide in the same manner as with silica I(d). The so treated silica product was designated silica I(e).

The various silica samples I(a) through I(e) were compounded with elastomer and compounding ingredients set forth in Table II and all vulcanizates were cured at 287° F. for 45 minutes.

TABLE II

| Compound ingredients: | Quantities (wt. parts) |
|---|---|
| Butadiene-styrene copolymer [1] | 100 |
| Silica pigment material | 58.5 |
| Antioxidant—2,2 - methylene - bis(4 - methyl-6-t.-butyl-phenol) | 2.0 |
| Triethanolamine | 1.0 |
| Paracoumarone-indene resin | 10.0 |
| Stearic acid | 3.0 |
| Zinc oxide | 5.0 |
| Di-2-benzothiazyl disulphide | 1.25 |
| N,N'-di-o-tolylguanidine | 1.75 |
| Sulfur | 3.0 |

[1] SBR-1500.

The physical test data of the resulting vulcanizates are set forth in Table III herewith.

TABLE III

| Silica Tested (in vulcanizate) | Tensile (p.s.i.) | Elongation (percent) | Modulus (300%) | Hardness (Shore A) | Bulk Density (g./cc.) of silica |
|---|---|---|---|---|---|
| I(a) | 738 | 400 | 632 | 71 | 0.35 |
| I(b) | 3,500 | 650 | 912 | 70 | 0.180 |
| I(c) | 3,825 | 750 | 700 | 68 | 0.186 |
| I(d) | 4,050 | 650 | 920 | 71 | 0.183 |
| I(e) | 3,680 | 625 | 965 | 70 | 0.172 |

Thus the physical test data of the silica samples I(a) through I(e) show that the after-treatments for converting the alkalinity of the untreated silica prepared by the process of this invention produce improved reinforcing silica materials.

It will be observed that the method of preparing silica pigment for the reinforcement of elastomers and the like by after-treatment of the water washed precipitated silica pigment in accordance with Examples I(d) and I(e) gave silica pigments which, when recovered and evaluated as reinforcing pigments in butadiene-styrene rubber vulcanizate, imparted thereto an ultimate tensile strength and a 300% modulus both greater than those imparted by the same precipitated silica pigment after-treated by making acid to methyl orange with mineral acid and adjusting to a pH of 7.2 with sodium carbonate.

The prolonged carbonation with carbon dioxide according to this invention can be carried out prior to the removal of a part or all of the mother liquor and it is of course understood that sufficient carbon dioxide must be supplied to convert all of the alkali metal carbonate in the aqueous phase to alkali metal bicarbonate, prior to the continuing treatment with carbon dioxide to convert the bound alkali of the precipitated pigment substantially or completely to alkali metal bicarbonate.

When the said continuing treatment is effected in substantial absence of the mother liquor then it is not necessary to rewash the resulting silica pigment during its recovery.

Carbon dioxide may be employed as acidulating agent in lieu of the sodium bicarbonate employed in the foregoing example for the preparation of the silica pigment from aqueous alkali metal silicate. Also the acidulation and the after-treatment may be expedited by elevation of temperature.

It will be observed that in preparing the silicas of Examples I(d) and I(e) the precipitated silica pigment was prepared by acidulating sodium silicate solution with sodium bicarbonate in an amount somewhat in excess of the stoichiometric quantity required to react with the sodium silicate to produce silica and sodium carbonate, $Na_2CO_3$, as distinguished from sodium bicarbonate. The carbon dioxide used for after-treatment converted the residual alkali in the aqueous phase to sodium bicarbonate. Dilute aqueous sodium bicarbonate solution has a pH of 8.0 to 8.5. The same solution through which carbon dioxide is bubbling has a pH of below 6.5 due to the formation of carbonic acid therein, and when the supply of carbon dioxide is removed the solution pH rises with loss of carbon dioxide until the pH of 8.0 to 8.5 is again obtained. The recovered reinforcing pigment I(d) when reslurried in water (10%) showed a pH of 8.5. Thus it is evident that the prolonged after-treatment of the silica slurry with the carbon dioxide in the preparation of silica I(d) gradually converted the bound alkali of the pigment to sodium bicarbonate.

We are here concerned with two types of alkali of the pigment. The alkali carried down by the silica precipitated from sodium silicate solution, and not easily removed with water, which is conventionally called bound alkali, is so referred to herein. This bound alkali causes the pigment particles to adhere together on drying. By the prolonged treatment with carbon dioxide to form sample I(d) this adhesive bound alkali of the precipitated silica pigment of Example I was converted to sodium bicarbonate retained by the silica pigment, and we have found that the so modified pigment particles are not adhesive.

Otherwise presented, the usual bound alkali of precipitated silica pigment may be represented by the residual $Na_2O$ in the formula $SiO_2/Na_2O)_{.001-.044}$ and by the present process, may be regarded as having been first converted to the form

$$SiO_2/(Na_2CO_3)_{.002-.075}$$

and then to the form

$$SiO_2/(NaHCO_3)_{.003-.119}$$

Thus the recovered treated silica pigment may have an alkali content expressed as $NaHCO_3$ of 0.3% to about 12%, preferably 0.8% to 2.5%, by weight based on $SiO_2$.

It will be appreciated that both the precipitated silica pigment and the recovered treated silica pigment, when dried at 105° C. for example, to eliminate free water, still contain bound water.

The term "free water," denotes the water which may be removed from the silica pigment by heating the pigment at a temperature of 105° C. to constant weight. The term "bound water," denotes the amount of water which is driven off from a silica pigment by heating the pigment at ignition temperature, for example, 1000 to 1200° C., to constant weight minus the amount of free water.

The terms "silica" and "silica pigment" as used herein refer to the silica including its bound water. The term "carbon dioxide" includes dilute carbon dioxide, e.g. from the combustion of hydrocarbon material.

Example 2

To a stainless steel reactor agitated by a propeller stirrer was added 63 liters of water and 14,065 grams (20 moles $Na_2O(SiO_2)_{3.22}$) of 41° Bé. commercial sodium silicate. The agitator was started and the dilute sodium silicate solution thoroughly mixed and its temperature raised to 80° C. and maintained.

Carbon dioxide was introduced through a tube leading to the bottom of the reactor at a moderate rate. For the acidulation rate see Table IV.

TABLE IV

[Silica preparation from $Na_2O(SiO_2)_{3.22}$ 20 moles at 80° C.]

| Time, cumulative (minutes): | Carbon dioxide (cumulative) (moles) |
|---|---|
| 0 | 0 |
| 30 | 1.1 |
| 60 | 2.2 |
| 90 | 3.2 |
| 120 | 4.1 |
| 150 | 5.2 |
| 180 [1] | 6.1 |
| 240 | 7.7 |
| 300 | 9.0 |
| 360 | 10.4 |
| 420 [2] | 11.8 |
| 480 | 13.3 |
| 540 | 14.7 |
| 600 | 16.2 |
| 720 | 17.6 |
| 888 | 18.7 |
| 906 | 20.0 |
| 984 | 24.2 |

[1] Initial Tyndall effect.
[2] Beginning of silica precipitation.

After 180 minutes the degree of acidulation of the sodium silicate solution was 30.5% and the blue color of Tyndall effect was observed and at this time 15 liters of water was added.

At 195 minutes or about 85 minutes after the appearance of the Tyndall effect the precipitation of silica commenced. At 420 minutes the silica commenced to precipitate.

At the termination of the reaction a total of 24.2 moles of carbon dioxide had been introduced.

The reactor was cooled and the silica slurry was pumped into a filter where it was filtered and washed until the filtrate from the aqueous slurry had a resistivity of 1700 ohms/cm.

An 1840 g. portion of the silica filter cake was dried at 105° C. to yield 292 g. of dry silica which was micropulverized and designated comparison sample 2(a).

Another portion of the filter cake was slurried in water. The silica slurry was placed in an agitated glass vessel and carbon dioxide bubbled through while agitating for 885 minutes. Prior to carbonation a few drops of phenolphathalein were added to the slurry which produced a noticeable pink color. After about 5 minutes of carbonation the phenolphthalein indicator turned colorless indicating that the alkali of the liquor had been all converted to bicarbonate.

After 30 minutes of carbonation the first sample was taken and thereafter at intervals as shown in Table V. The solution alkalinity, precipitate alkalinity and total alkalinity were determined on each sample. The alkalinity of the total sample was determined by boiling with an excess of 0.1 N sulfuric acid and with methyl orange (pH range 3.1–4.4) as indicator and back titrating with 0.1 N sodium hydroxide solution. The alkalinity of the filtrate was determined by filtering a portion of each of the samples and titrating an aliquot portion thereof with 0.1 N sulfuric acid using methyl orange as the indicator.

The solids for each sample were determined and the data set forth in Table V were calculated from the observed data.

TABLE V.—TREATMENT SILICA SLURRY WITH CARBON DIOXIDE

| Sample (No.) | Time of Carbonation Cumulative (min.) | Alkalinity | | |
|---|---|---|---|---|
| | | Silica Slurry (percent) | Silica (percent) | Liquor (percent) |
| 1 | 30 | 2.04 | 0.34 | 1.70 |
| 2 | 90 | 2.00 | 0.33 | 1.67 |
| 3 | 265 | 1.96 | 0.31 | 1.65 |
| 4 | 375 | 1.97 | 0.33 | 1.64 |
| 5 | 525 | 1.94 | 0.55 | 1.40 |
| 6 | 885 | 1.91 | 0.69 | 1.22 |

It is to be noted that for the first 375 minutes of carbonation little change took place in the amount of alkali in the silica liquor with respect to that in the silica precipitate. By 525 minutes the silica precipitate had begun to adsorb sodium carbonate from the solution which probably indicated that the charge on the silica (zeta potential) was changing and that the bound alkali on the silica was substantially or totally converted to bicarbonate. After 885 minutes the carbonation was terminated and the silica recovered by filtering and washing the filter cake with 2 liters of water. The filter cake yield was 1430 g. which was dried at 105° C. to yield 375 g. of dry silica designated as sample 2(b).

The silicas of Examples 2(a) and 2(b) were each compounded with SBR–1502 in accordance with the compounding recipe given in Table VI. From the physical test results set forth in Table VII it is seen that the silica 2(b) was an improvement over the silica of the comparative Example 2(a).

TABLE VI

Compound ingredients:          Quantities (wt. parts)
    Butadiene-styrene copolymer (SBR–1502) -- 100
    Silica pigment material _____ 50
    Antioxidant—2,2 - methylene - bis(4 - methyl-
      6-t.-butylphenol) (antioxidant 2246) _____2.0
    Triethanolamine _____ 1.0
    Paracoumarone-indene resin (Cumar MH
      2½) _____ 2.5
    Reogen _____ 5.0
    Zinc oxide _____ 5.0
    Magnesium oxide _____ 4.0
    Di-2-benzothiazyl disulphide (Altax) _____ 0.75
    N,N'-di-o-tolyguanidine (DTOG) _____ 1.5
    Sulfur _____ 2.0

In compounding the stock the selected silica pigment material was milled into the SBR–1502 together with the anti-oxidant and other compounding ingredients and the stock was aged overnight and then remilled and cured for 120 minutes at 287° F.

TABLE VII

| Silica Tested (in vulcanizate) | Tensile (p.s.i.) | Elongation (percent) | Modulus (300%) | Hardness (Shore A) |
|---|---|---|---|---|
| 2(a) Control | 2,790 | 720 | 575 | 61 |
| 2(b) | 3,675 | 760 | 575 | 60 |

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claim, and that all modifications that come within the meaning and range of equivalents of the claim are intended to be included therein.

We claim:

An alkaline precipitated silica pigment having a sodium bicarbonate content within the range $$SiO_2/(NaHCO_3)_{.003-.119}$$

said silica pigment having been prepared by maintaining silica pigment containing bound alkali in contact with aqueous carbonic acid at a pH of below 6.5 for a sufficiently prolonged period to convert the bound alkali of the pigment predominantly to sodium bicarbonate.

References Cited by the Examiner

UNITED STATES PATENTS

| 1,751,955 | 3/1930 | Stoewener | 23—182 |
| 2,863,727 | 12/1958 | Thornhill et al. | 23—182 |
| 2,940,830 | 6/1960 | Thornhill | 23—182 |

OSCAR R. VERTIZ, *Primary Examiner.*

MAURICE A. BRINDISI, H. S. MILLER, R. M. DAVIDSON, A. GRIEF, *Assistant Examiners.*